United States Patent
Wahl et al.

(10) Patent No.: US 11,993,341 B2
(45) Date of Patent: May 28, 2024

(54) METHOD AND DEVICE FOR CARRYING OUT AUTONOMOUS BRAKING IN A TWO-WHEELED MOTOR VEHICLE

(71) Applicant: Robert Bosch GmbH, Stuttgart (DE)

(72) Inventors: Anja Wahl, Markgroeningen (DE); Markus Henzler, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 291 days.

(21) Appl. No.: 17/596,392

(22) PCT Filed: Apr. 28, 2020

(86) PCT No.: PCT/EP2020/061712
§ 371 (c)(1),
(2) Date: Dec. 9, 2021

(87) PCT Pub. No.: WO2021/001080
PCT Pub. Date: Jan. 7, 2021

(65) Prior Publication Data
US 2022/0161889 A1 May 26, 2022

(30) Foreign Application Priority Data
Jul. 4, 2019 (DE) .................... 10 2019 209 864.9

(51) Int. Cl.
*B60T 7/12* (2006.01)
*B60T 7/22* (2006.01)
(Continued)

(52) U.S. Cl.
CPC .............. *B62L 3/00* (2013.01); *B60T 7/12* (2013.01); *B60T 7/22* (2013.01); *B60T 8/1706* (2013.01);
(Continued)

(58) Field of Classification Search
CPC ..... B62L 3/00; B60T 7/12; B60T 7/22; B60T 8/1706; B60T 8/17551; B60T 8/17555;
(Continued)

(56) References Cited

U.S. PATENT DOCUMENTS

2004/0030499 A1* 2/2004 Knoop ............... B60K 31/0008
340/436
2012/0173068 A1* 7/2012 Seiter .................... B60W 30/16
701/70
(Continued)

FOREIGN PATENT DOCUMENTS

CN 108749818 A 11/2018
DE 102004018394 A1 11/2005
(Continued)

OTHER PUBLICATIONS

English translation of DE 10 2012 221615 (Year: 2012).*
(Continued)

*Primary Examiner* — Erick R Solis
(74) *Attorney, Agent, or Firm* — NORTON ROSE FULBRIGHT US LLP; Gerard A. Messina

(57) ABSTRACT

A method for carrying out autonomous braking in a two-wheeled motor vehicle, where the necessity of vehicle deceleration is detected with the aid of a surround sensor system. When vehicle deceleration is necessary, prior to its execution, a test braking action independent of a rider and of a predefined temporal length is carried out. During or after the execution of the test braking action, a rider readiness variable characterizing the readiness of the rider to master the vehicle deceleration detected as necessary is ascertained. After completion of the test braking action, the vehicle deceleration is initiated, the time characteristic of the vehicle deceleration being a function of the rider readiness variable.

10 Claims, 2 Drawing Sheets

(51) Int. Cl.
   *B60T 8/00*    (2006.01)
   *B60T 8/17*    (2006.01)
   *B60T 8/1755*  (2006.01)
   *B60T 8/32*    (2006.01)
   *B62L 3/00*    (2006.01)

(52) U.S. Cl.
   CPC ...... *B60T 8/17551* (2013.01); *B60T 8/17555* (2013.01); *B60T 8/17558* (2013.01); *B60T 8/3225* (2013.01); *B60T 2201/022* (2013.01); *B60T 2210/32* (2013.01); *B60T 2220/02* (2013.01); *B60T 2250/04* (2013.01)

(58) Field of Classification Search
   CPC .............. B60T 8/17558; B60T 8/3225; B60T 2201/022; B60T 2201/12; B60T 2210/32; B60T 2220/02; B60T 2250/04
   USPC ............................ 701/70, 72, 76, 78, 83, 84
   See application file for complete search history.

(56) References Cited

U.S. PATENT DOCUMENTS

| | | |
   |---|---|---|
   | 2017/0057513 A1 | 3/2017 | Ohashi et al. |
   | 2017/0192433 A1 | 7/2017 | Kuttenberger |
   | 2018/0208189 A1* | 7/2018 | Ginther ................ B60W 50/14 |
   | 2019/0077396 A1 | 3/2019 | Kuttenberger |

FOREIGN PATENT DOCUMENTS

| | | |
   |---|---|---|
   | DE | 102012221615 A1 | 5/2014 |
   | DE | 102017201693 A1 | 8/2018 |
   | DE | 102018221720 A1 | 6/2020 |
   | JP | 2012026313 A | 2/2012 |
   | JP | 2018118716 A | 8/2018 |
   | JP | 2018176861 A | 11/2018 |
   | JP | 2019026165 A | 2/2019 |
   | JP | 2019059437 A | 4/2019 |

OTHER PUBLICATIONS

English translation of JP 2019-026165 (Year: 2019).*
   English translation of JP 2018-176861 (Year: 2018).*
   International Search Report for PCT/EP2020/061712, dated Sep. 30, 2020.

* cited by examiner

METHOD AND DEVICE FOR CARRYING OUT AUTONOMOUS BRAKING IN A TWO-WHEELED MOTOR VEHICLE

BACKGROUND INFORMATION

German Patent Application DE 10 2018 221 720.3 (which is not a prior publication), relates to a method for carrying out autonomous braking in a two-wheeled motor vehicle, where
- the necessity of vehicle deceleration is detected with the aid of a surround sensor system;
- as a function of this, vehicle deceleration independent of the rider is initiated;
- after the vehicle deceleration is initiated, a rider readiness variable characterizing the readiness of the rider to master the vehicle deceleration maneuver is ascertained; and
- the time characteristic of the vehicle deceleration is continued as a function of the rider readiness variable.

SUMMARY

The present invention relates to a method for carrying out rider-independent, that is, autonomous braking in a two-wheeled motor vehicle. In accordance with an example embodiment of the present invention,
- the necessity of vehicle deceleration independent of the rider, that is, braking independent of the rider, that is, autonomous braking, is detected with the aid of a surround sensor system;
- when vehicle deceleration is necessary, prior to its execution, a test braking action independent of a rider and of a predefined temporal length is carried out;
- during or after the execution of the test braking action, a rider readiness variable characterizing the readiness of the rider to master the vehicle deceleration detected as necessary is ascertained; and
- after completion of the test braking action, the vehicle deceleration independent of the rider is initiated; the time characteristic of the vehicle deceleration being a function of the rider readiness variable.

The present invention allows a reduction in risk during automatic emergency braking of a two-wheeled vehicle. In such a situation, a distracted rider not prepared for the braking may lose control over the two-wheeled vehicle completely. Therefore, it is useful to incorporate a rider readiness variable, which characterizes the readiness of the rider to master the vehicle deceleration maneuver, into the automatic braking maneuver and/or emergency braking maneuver. The test braking action results in a temporary deceleration and is designed in such a manner, that it is uncritical even in the case of missing physical readiness of the rider to brake, e.g., while he/she is looking to the side or riding with one hand. The test braking action is carried out by reducing a motor torque, or by reducing a motor torque while simultaneously increasing a braking torque at one or both wheels of the motorcycle. The test braking action functions over only a short time and decelerates the motorcycle only slightly. For the inattentive or distracted rider, the test braking action functions as a warning to the rider and may therefore be referred to as a warning jerk, as well.

In one advantageous refinement of the present invention, the surround sensor system is a radar sensor system, a lidar sensor system, or a video sensor system. Such sensor systems are already widespread in the passenger car sector and may also be used in the two-wheeled vehicle sector.

In one advantageous refinement of the present invention, the rider readiness variable may assume at least two different values.

In one advantageous refinement of the present invention, the rider readiness variable may assume two values, where
- one of the two values signals a rider state ready for the vehicle deceleration maneuver; and
- the other of the two values signals a rider state not ready for the vehicle deceleration maneuver.

In one advantageous refinement of the present invention:
- in response to a ready state of the rider, the autonomous braking is carried out, using a planned, desired braking-force characteristic;
- in response to an unready state of the rider, it is carried out, using a braking-force characteristic, which includes a lower deceleration and/or a lesser jerk in comparison with the braking-force characteristic in the case of a ready state of the driver.

By carrying out the emergency braking at a lower intensity in response to a driver state identified as not ready, the risk of the rider falling as a result of a loss of control over the two-wheeled vehicle may be reduced. Nevertheless, the lighter emergency braking directs the attention of a distracted rider to the current riding situation, since the emergency braking functions simultaneously as a warning to the rider.

In one advantageous refinement of the present invention, the rider readiness variable is ascertained after initiation of the test braking action, in light of the output signals of an inertial sensor system attached to the motor vehicle.

In one advantageous refinement of the present invention, the rider readiness variable is ascertained after initiation of the test braking action, in light of the steering angle and/or the steering torque.

In one advantageous refinement of the present invention, the rider readiness variable is ascertained after initiation of the test braking action, in light of the output signals of pressure-sensitive contact sensors attached to the motor vehicle.

In one advantageous refinement of the present invention, the rider readiness variable is ascertained after initiation of the test braking action, in light of the output signals of wheel speed sensors or compression travel sensors.

In addition, the present invention includes an apparatus having devices, which are configured to implement the methods according to the present invention. This is, in particular, a control unit, in which the program code for implementing the methods of the present invention is stored.

DETAILED DESCRIPTION OF EXAMPLE EMBODIMENTS

Figure 1:
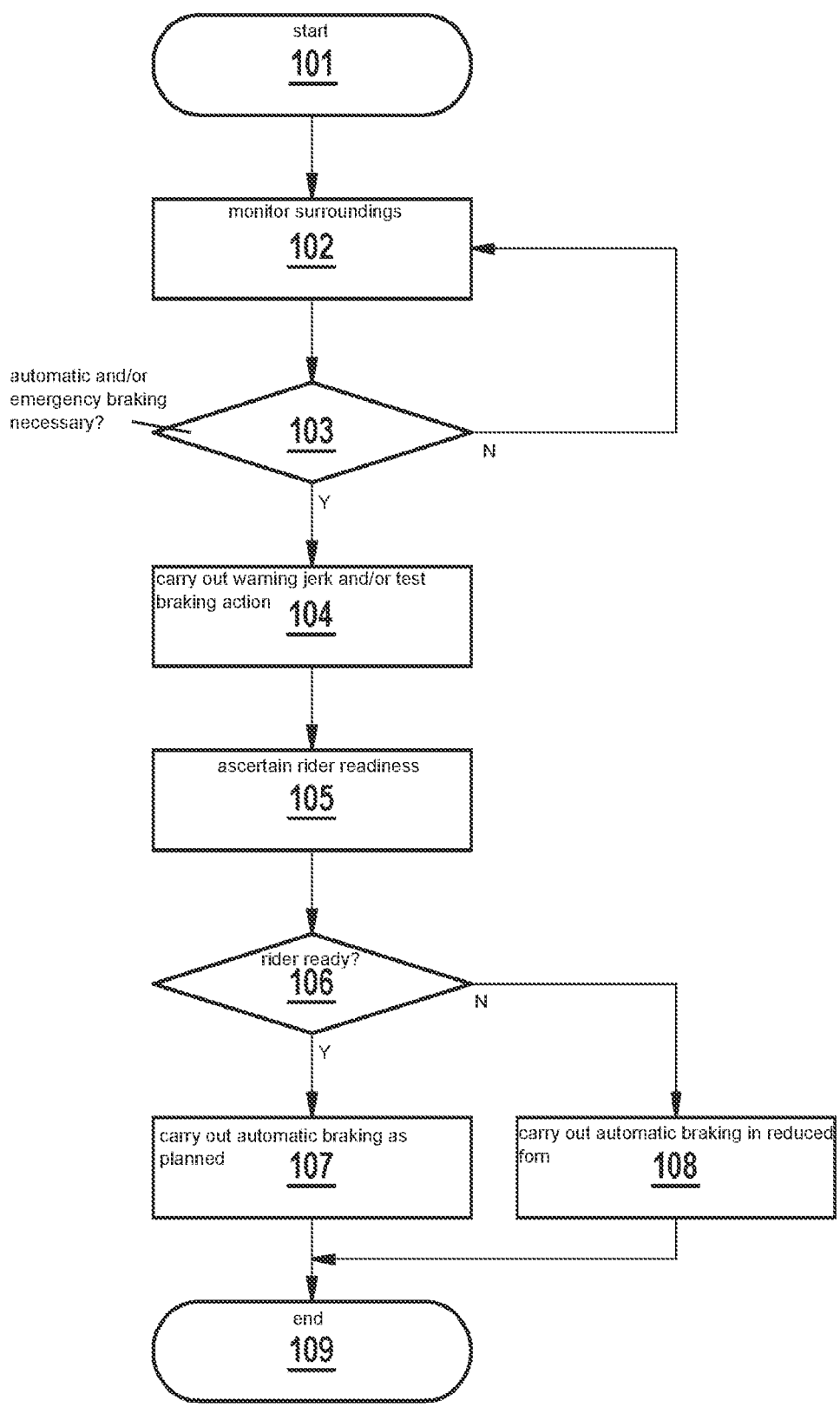
FIG. 1 shows the chronological sequence of an example embodiment of the present invention.

The progressive development of high-level assistance systems for motorcycle riders requires accurate knowledge of the state of the rider. So if, for example, automatic braking is initiated, the rider must be ready for this. This requires, in particular, physical readiness. Steering of the motorcycle with two hands is necessary for complete control. With the aid of suitable sensor technology, this readiness, e.g., whether or not the rider has both hands on the handlebars, may be detected during a braking maneuver already initiated.

As in the case of passenger cars, with motorcycles, it is also to be assumed that a warning is issued prior to automatic emergency braking. The warning jerk for indicating an imminent risk of collision, possibly including subsequent, automatic emergency braking, appears to be particularly suitable for motorcycles, since in contrast to a trip with a passenger car, in particular, optical, but also acoustic warning signals are more difficult to perceive while riding a motorcycle.

The present invention includes detecting the rider state and, consequently, the physical braking readiness of the motorcycle rider for subsequent, automatic emergency braking, during the warning jerk, using sensors that are already situated on the vehicle. The triggering and the form and/or intensity of the automatic emergency braking ensue as a function of the detected rider state.

With the aid of a predictive surround sensor system, the surroundings may be monitored, and an imminent collision may be detected. In order to indicate this to the driver prior to automatic emergency braking, a warning jerk is triggered. The warning jerk corresponds to a temporary deceleration and is designed in such a manner, that it is even uncritical in the case of missing physical readiness of the rider, e.g., while he/she is looking to the side or riding with one hand. The warning jerk is produced by reducing a motor torque, or by reducing a motor torque while simultaneously increasing a braking torque at one or both wheels of the motorcycle. The warning jerk functions over only a short time and decelerates the motorcycle only slightly.

The present invention includes modeling the state of the rider by measuring the overall system reaction to the warning jerk. In a first step, e.g., a readiness of the rider to brake may be derived from the measurement of the inertial sensor system. If, for example, the rider only has one hand on the handlebars during the temporary deceleration caused by the warning jerk, the bracing torque of the rider produces a movement of the handlebars. This movement causes a change in the dynamics of the overall system, which is registered, using the inertial measuring technology. From this, it may be deduced that the rider is not ready for the nominal, subsequently intended, automatic emergency braking maneuver.

Ideally, the rates of rotation and decelerations of the motorcycle in all three spatial directions may be measured with the aid of the inertial sensor system. However, variants of the present invention may also use only individual inertial signals.

In one development of the present invention, the model for detecting the state of a rider uses exclusively the measured roll rate, that is, the rate of rotation about the vehicle longitudinal axis of the motor cycle.

In addition to the vehicle roll rate, one development utilizes the vehicle yaw rate, that is, the rotation of the vehicle about the vertical axis, in the model for detecting the state of a rider.

One further development uses the vehicle roll rate, yaw rate and transverse acceleration.

In order to detect the rider state during the warning jerk, in a further development, in addition to signals of the inertial sensor system, signals of a steering angle sensor are also evaluated.

In order to expand the model for detecting the state of a rider beyond that, additional sensors may be evaluated:
  steering torque sensors, in order to measure the steering reaction
  spring deflection sensor system, in order to measure the pitching motion of the vehicle
  the wheel speed sensors
  pressure-sensitive contact sensors, in order to measure the degree of bracing at contact points, e.g. grips, knees, or feet The subsequent, automatic emergency braking is possibly triggered as a function of the detected rider state. If the rider state "ready for braking" is detected, then the nominal, automatic emergency braking is carried out. If the rider state "not ready for braking" is detected, then automatic braking with adjusted deceleration is initiated, so that this is also uncritical in the rider state not ready for braking. Thus, in one variant of the adjusted braking, the magnitude of the deceleration may be reduced in comparison with the nominal value. In a further variant, the jerk, that is, the gradient of the build-up of the deceleration, may be reduced, as well.

Figure 2:
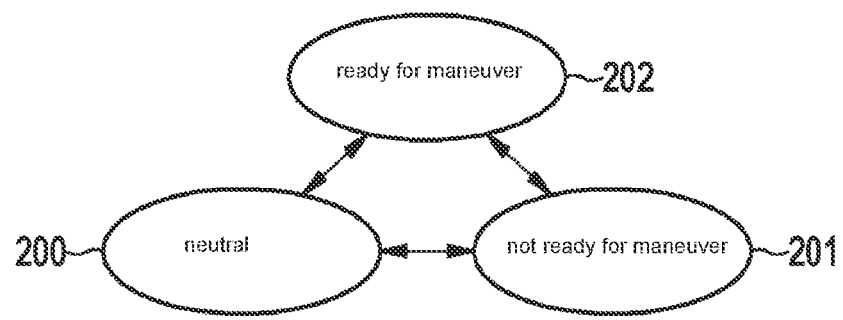
FIG. 2 shows a state diagram for three states, where two states are rider states.

For example, the model of the rider may include three states, as is represented in FIG. 2. Here, block 200 denotes the state "neutral," block 201 denotes the state "not ready for maneuver," and block 202 denotes the state "ready for maneuver." In this context, it is to be taken into consideration that the state "ready for maneuver" is the state that is assumed before the rider state, which may assume the status "ready for maneuver" or "not ready for maneuver," has been ascertained.

FIG. 1 shows the chronological sequence of an embodiment of the present invention. After the start of the method in block 101, in block 102, the surroundings are monitored. In block 103, it is subsequently ascertained if automatic braking and/or emergency braking is necessary. If this is the case, then, in block 104, a warning jerk and/or test braking action independent of the rider is carried out. If no braking is necessary, then the method returns from block 103 to block 102. In light of data acquired during the warning jerk, in block 105, the current readiness of the rider to master the necessary automatic braking is ascertained with the aid of a rider state model. As a function of this, the further characteristic of the braking is decided in block 106. To that end, in FIG. 1, two possible time characteristics of the braking force are used. If the rider state is ascertained as ready for braking, then, in block 107, automatic braking is carried out as planned. However, if the rider state is ascertained as not ready for braking, then, in block 108, automatic braking is only carried out in reduced form. The method ends in block 109.

FIG. 2 illustratively shows the following states in the form of a state diagram:
  Block 200: neutral state
  Block 201: rider state "not ready for automatic braking maneuver"
  Block 202: rider state "ready for automatic braking maneuver"

The bidirectional arrow connections between the three states indicate that a transition between the different states is also possible, if the state of the rider changes during the automatic braking maneuver.

Figure 3:
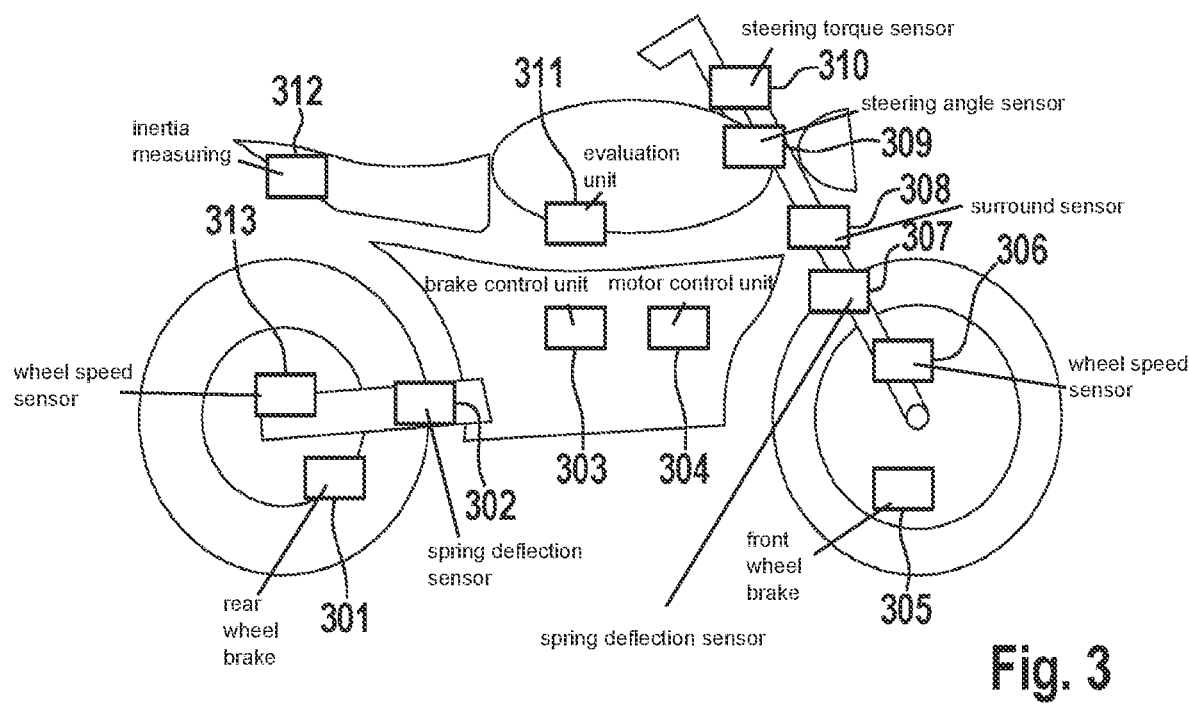
FIG. 3 shows a schematic side view of a motorcycle including main motorcycle components usable for the present invention.

A schematic side view of a motorcycle including the following example motorcycle components usable for the present invention is shown in FIG. 3.
  301: rear wheel brake
  302: spring deflection sensor on the rear wheel
  303: brake control unit 304: motor control unit
305: front wheel brake
306: wheel speed sensor on the front wheel
307: spring deflection sensor on the front wheel
308: surround sensor
309: steering angle sensor
310: steering torque sensor
311: evaluation unit for the state of the rider
312: inertia measuring technology
313: wheel speed sensor on the rear wheel

What is claimed is:

1. A method for carrying out autonomous braking in a two-wheeled motor vehicle, the method comprising the following steps:
    detecting a necessity of vehicle deceleration using a surround sensor system;
    carrying out, based on detecting that the vehicle deceleration is necessary and prior to execution of the vehicle deceleration, a test by:
        initiating a preliminary braking action that is independent of the rider and that is of a predefined temporal length;
        modeling a reaction of the rider to the preliminary braking action in a period beginning from a time of the initiation of the preliminary braking action, the modeling being based on at least one of measurement of a roll motion of the motor vehicle, a yaw motion of the motor vehicle, a pitch motion of the motor vehicle, a steering angle of the motor vehicle; and
        ascertaining, based on the modeled reaction, a rider readiness variable characterizing readiness of the rider to master the vehicle deceleration detected as necessary; and
    initiating, after completion of the test, the vehicle deceleration, wherein a time characteristic of the vehicle deceleration is set as a function of the rider readiness variable.

2. The method as recited in claim 1, wherein the surround sensor system is a radar sensor system, or a lidar sensor system, or a video sensor system.

3. The method as recited in claim 1, wherein the rider readiness variable may assume at least two different values.

4. The method as recited in claim 3, wherein the rider readiness variable may assume two values, where:
    one of the two values signals a rider state ready for the vehicle deceleration detected as necessary; and
    the other of the two values signals a rider state not ready for the vehicle deceleration detected as necessary.

5. The method as recited in claim 4, wherein:
    in response to the ready state of the rider, the autonomous braking is carried out, using a planned, desired braking-force characteristic; and
    in response to a not ready state of the rider, the autonomous braking is carried out, using a braking-force characteristic, which includes a lower deceleration and/or a lesser jerk in comparison with the braking-force characteristic in the case of the ready state of the driver.

6. The method as recited in claim 1, wherein the modeling is performed using output signals of an inertial sensor system attached to the motor vehicle.

7. The method as recited in claim 1, wherein the modeling is performed based on the steering angle and/or a steering torque.

8. The method as recited in claim 1, wherein the rider readiness variable is ascertained in light of output signals of pressure-sensitive contact sensors attached to the motor vehicle.

9. The method as recited in claim 1, wherein the rider readiness variable is ascertained in light of output signals of wheel speed sensors or compression travel sensors.

10. An apparatus configured to carry out autonomous braking in a two-wheeled motor vehicle, the apparatus configured to:
    detect a necessity of vehicle deceleration using a surround sensor system;
    carry out, based on detecting that the vehicle deceleration is necessary and prior to execution of the vehicle deceleration, a test by:
        initiating a preliminary braking action that is independent of the rider and that is of a predefined temporal length;
        modeling a reaction of the rider to the preliminary braking action in a period beginning from a time of the initiation of the preliminary braking action, the modeling being based on at least one of measurement of a roll motion of the motor vehicle, a yaw motion of the motor vehicle, a pitch motion of the motor vehicle, a steering angle of the motor vehicle; and
        ascertaining, based on the modeled reaction, a rider readiness variable characterizing readiness of the rider to master the vehicle deceleration detected as necessary; and
    initiate, after completion of the test, the vehicle deceleration, wherein a time characteristic of the vehicle deceleration is set as a function of the rider readiness variable.

* * * * *